United States Patent
Hutchison et al.

(10) Patent No.: US 8,352,762 B2
(45) Date of Patent: Jan. 8, 2013

(54) RECYCLING OF CACHE CONTENT

(75) Inventors: Gordon D. Hutchison, Eastleigh (GB); Paul J. Quelch, Emsworth (GB)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 12/726,537

(22) Filed: Mar. 18, 2010

(65) Prior Publication Data

US 2010/0257385 A1  Oct. 7, 2010

(30) Foreign Application Priority Data

Apr. 1, 2009  (EP) ..................................... 09157081

(51) Int. Cl.
*G06F 1/00* (2006.01)
*G06F 13/00* (2006.01)
(52) U.S. Cl. .................. 713/310; 713/300; 711/162
(58) Field of Classification Search .................. 713/310
See application file for complete search history.

(56) References Cited

U.S. PATENT DOCUMENTS

| | | | | |
|---|---|---|---|---|
| 5,448,719 A | * | 9/1995 | Schultz et al. | 714/5.11 |
| 6,601,181 B1 | * | 7/2003 | Thomas | 713/340 |
| 7,380,055 B2 | * | 5/2008 | Ashmore | 711/112 |
| 7,793,061 B1 | * | 9/2010 | Gupta et al. | 711/162 |
| 8,176,262 B2 | * | 5/2012 | Dave et al. | 711/146 |
| 2005/0117418 A1 | * | 6/2005 | Jewell et al. | 365/202 |

FOREIGN PATENT DOCUMENTS

JP           04259989 A  *  9/1992

* cited by examiner

*Primary Examiner* — Suresh Suryawanshi
(74) *Attorney, Agent, or Firm* — Griffiths & Seaton PLLC (57) ABSTRACT

A method of operating a storage system comprises detecting a cut in an external power supply, switching to a local power supply, preventing receipt of input/output commands, copying content of cache memory to a local storage device and marking the content of the cache memory that has been copied to the local storage device. When a resumption of the external power supply is detected, the method continues by charging the local power supply, copying the content of the local storage device to the cache memory, processing the content of the cache memory with respect to at least one storage volume and receiving input/output commands. When detecting a second cut in the external power supply, the system switches to the local power supply, prevents receipt of input/output commands, and copies to the local storage device only the content of the cache memory that is not marked as present.

20 Claims, 4 Drawing Sheets

RECYCLING OF CACHE CONTENT

CLAIM TO FOREIGN PRIORITY

This application claims priority to European Patent Application No. 09157081.2, filed Apr. 1, 2009, and entitled "Recycling of Cache Content."

BACKGROUND OF THE INVENTION

1. Field of the Invention

The present invention relates in general to computers, and more particularly to apparatus, method, and computer program product embodiments for efficiently facilitating emergency power off/on cycles to resume normal operation in a computing storage environment via the recycling of cache content.

2. Description of the Related Art

In computer storage systems it is common to have multiple storage volumes connected to a single storage volume controller, which is responsible for the reading and writing of data with respect to the storage volumes. All input/output commands for the storage volumes are handled by the volume controller, which also provides a cache memory to speed up portions of the data handling. Power for the overall storage system is provided by a mains electricity supply, with a back-up power supply in the form of a so-called UPS (uninterruptible power supply).

UPS devices effectively function as a battery maintaining a certain amount of charge that will be used when the mains power is cut for any reason. The UPS provides enough power for the storage controller to shut down the system in an orderly manner without any data being lost. The main requirement for the power is the controller's cache, which requires power to maintain the data it stores, and must have its data hardened to some form of permanent storage device, such as the controller's hard disk.

SUMMARY OF THE DESCRIBED EMBODIMENTS

Problems may arise in computer storage systems where an emergency power off (EPO) has occurred, and for some reason the system controller mechanism that shuts the system down and turns off the UPS has not worked properly. For example, the storage volume controller may operate until the UPS supply (which functions as a large rechargeable battery) is drained and then is forced off due to lack of power. When the storage system has the power restored, the storage volume controller may not operate until the UPS has recharged its emergency supply so that the system can run safely. As the UPS has to fully recharge, this may take some time before the storage volume controller is available for work, causing an unnecessarily long outage. The consequence of the power cut is that when a system comes to restore power and start the storage volume controller, the system has to wait for perhaps two hours before the storage volume controller starts while the UPS charges. The aforementioned example demonstrates a situation where the performance of the storage volume controller (and indeed many UPS powered devices) is not optimum and which can be improved.

In view of the foregoing, various embodiments for efficiently facilitating emergency power off/on cycles to resume normal operation in a computing storage environment via the recycling of cache content are provided. In one embodiment, by way of example only, there is provided a method of operating a storage system comprising the steps of detecting a cut in an external power supply, switching to a local power supply in a first instance, preventing receipt of input/output commands in a first instance, copying content of the cache memory to a local storage device, marking the content of the cache memory that has been copied to the local storage device, detecting resumption of the external power supply, charging the local power supply, copying the content of the local storage device to the cache memory, processing the content of the cache memory with respect to at least one storage volume, receiving input/output commands, detecting a second cut in the external power supply, switching to the local power supply in a second instance, preventing receipt of input/output commands in a second instance, and copying to the local storage device only the content of the cache memory that is not marked as present in the local storage device.

Additional system and computer program embodiments are disclosed and provide related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

The mechanisms of the illustrated embodiments allow for the recycle of hardened cache pages in emergency power off (EPO) dump files to enable a faster shutdown (and startup) in some EPO situations. These mechanisms provide the following exemplary benefits, among others. First, where a power failure is ragged in nature (e.g., a double failure within a short period of time), the mechanisms of the present invention allow for a faster subsequent EPO. A faster EPO is beneficial as it saves battery charge, allowing for a larger safety net of UPS charge in terms of EPOs and less charge consumed. The closer the second EPO is to the previous one, in terms of the percentage of cache pages which are new, the faster the shutdown will be. This percentage will climb from 0 to (presumably near) 100 percent as run time since the last EPO increases.

Second, as the mechanisms of the present invention increase the speed of the EPO, they will also shorten the time the storage volume controller waits for the UPS to recharge before the storage volume controller starts up. The mechanisms of the present invention provide an improvement that will shorten the down time for customers in the case where there is a loss of power and the UPS continues to supply power in place of the mains for as long as it can but also in the many cases where the UPS is partially drained during an EPO.

In one embodiment, the mechanisms of the present invention mark the content of the cache memory that has been copied to the local storage device in response to the second power cut, in a different manner to the marking of the content of the cache memory in response to the first power cut. The content stored by the cache memory, whether in "lines" or "pages" will be marked when content is copied to the local storage device. It is desirable to use a different mark for a different power cut, in order to be able to trace more accurately the content within the local storage device.

In an addition embodiment, the step of copying to the local storage device only the content of the cache memory that is not marked as present in the local storage device further comprises copying to the local storage device the respective mark for the content of the cache memory that is marked as present in the local storage device. The content in the cache memory that is marked as already present within the local storage device does not need to be copied across to the local storage device when there is a power cut. However, it is useful to copy across the mark for the page/sector of the cache to the local storage device, in order to aid the subsequent recall of the content from the local storage device, and also to maintain consistency of the representation of the cache memory in the local storage device.

In an additional embodiment, the step of marking the content of the cache memory comprises applying a numerical flag to the content. The step of marking the content of the cache memory may comprise applying the numerical flag to the content, the numerical flag being changed with each detected cut in the external power supply. In order to keep track of the data copied into the local storage device following each power cut, a succession of numbers, which can be negative, can be used to mark the parts of the cache that are copied into the local hard disk drive. This has the advantage of assisting in the keeping track of the content written into the local storage device.

Figure 1:
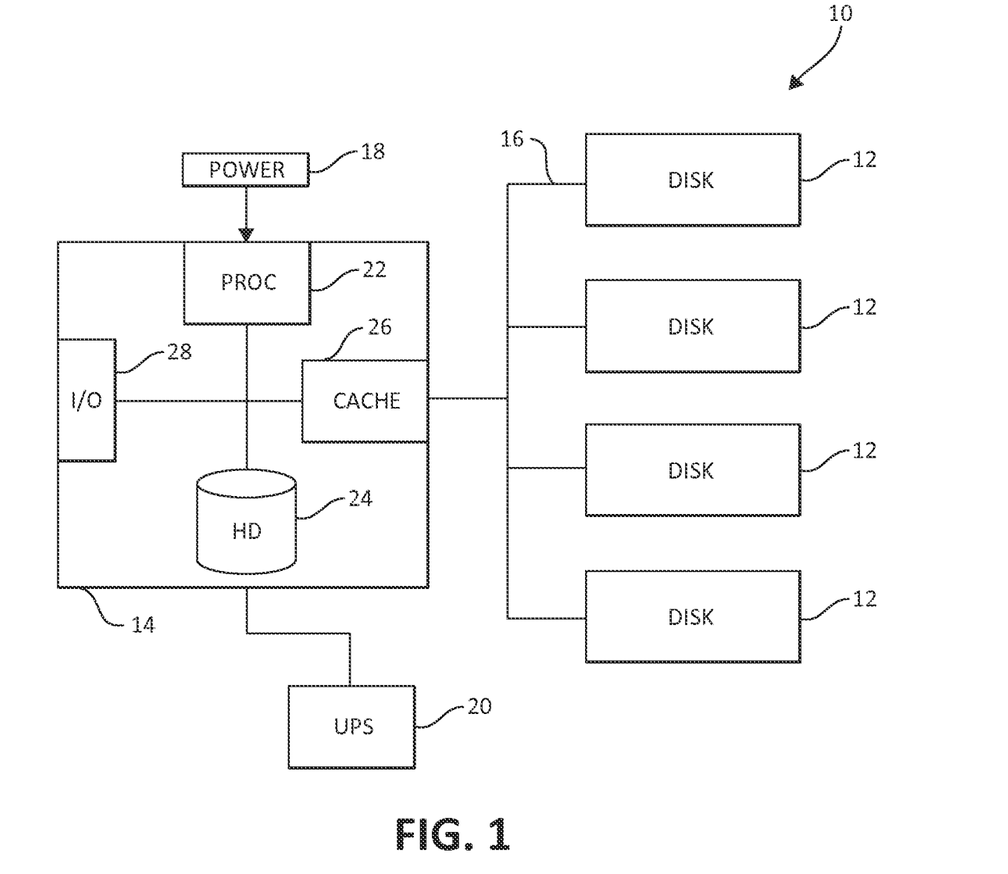
FIG. 1 is a schematic diagram of an exemplary storage system in which aspects of the present invention may be implemented.

Turning now to FIG. 1, an exemplary storage system 10 is shown capable of implementing aspects of the present invention. The storage system 10 comprises a number of storage volumes 12 which are connected to a storage volume controller 14. The storage volume controller 14 has a connection 16 to each storage volume 12, which in one embodiment is a fibre optic cable. The storage volume controller 14 manages the access to the storage volumes 12. All read and write requests made to the storage volumes are made through the storage volume controller 14. To an external computer connecting to the storage volume controller 14, the various disks 12 appear as a single memory storage function, regardless of the actual number of volumes 12 present.

The system 10 also includes an external power supply 18 and a local power supply 20. The external power supply 18 in the normal operation of the system powers the storage volume controller 14 and the storage volumes 12. The external power supply 18 is the standard electrical mains supply. The local power supply 20 is a battery that maintains an amount of charge for use when the external power supply 18 is cut off. The local power supply 20 is rechargeable, and is charged by the mains supply 18. The local power supply 20 is a UPS (uninterruptible power supply) and provides the necessary backup to avoid data loss if there is a mains power cut.

The storage volume controller 14 comprises a processor 22, a local storage device 24, a cache memory 26 and an interface 28 for receiving input/output commands from external computers with respect to the storage volumes 12. The cache memory 26, which could be of the order of several 100 GBs in size, is used in the processing of all input/output commands and will maintain a certain amount of the storage data. Since the cache memory 26 is much faster than the memory provided by the disks 12, repeated I/O commands to the same memory area will be handled by the cache 26 and only periodically will data be hardened to the volumes 12.

When a power failure occurs, the storage volume controller 14 uses the charge on the UPS 20 as a power source while the controller 14 does a safe shut down. The main activity of this shutdown is to dump the internal memory cache 26 to a non-volatile storage, which is the local hard disk drive 24. The time this takes is directly related to the size of the cache 26 used and the speed of the local disk 24, with larger caches taking longer to save to disk in an emergency power off. When power is restored, the storage volume controller 14 waits until the UPS 20 reports a level of charge that is enough for normal system operation before the storage volume controller 14 starts accepting new work in a completely normal manner (i.e. fully cached).

Figure 2A:
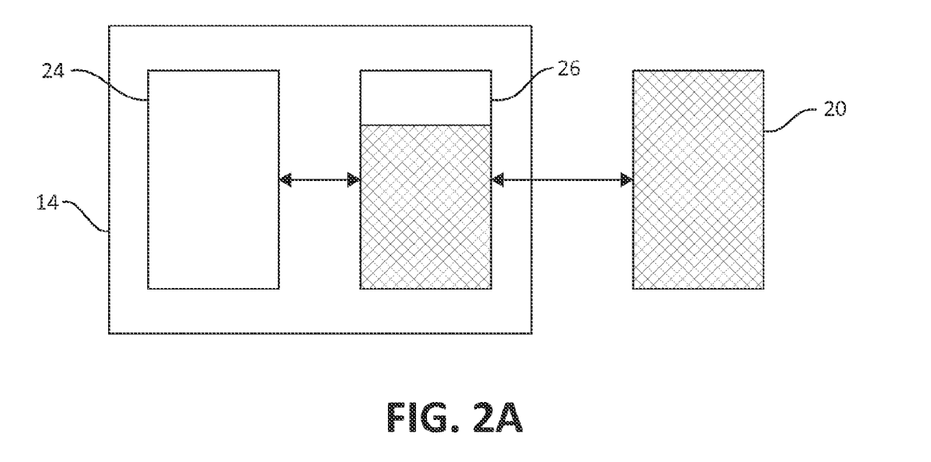
FIGS. 2 to 4 are schematic diagrams of part of the storage system shown during power outage and restart situations according to the present invention.
Figure 2B:
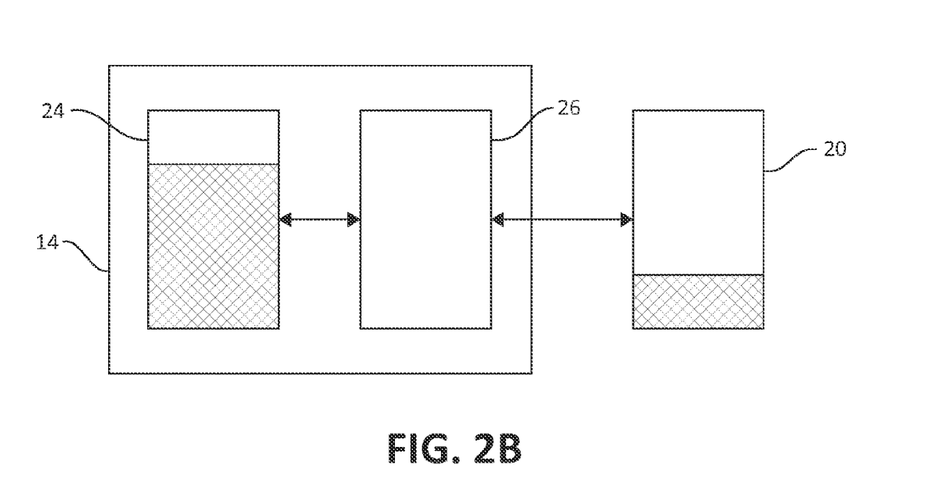

FIG. 2 illustrates schematically the operation of the system 10 when an emergency power off occurs as a result of the mains supply 18 being cut off. This Figure shows the storage volume controller 14 with the cache 26 and the local storage device (hard disk) 24. The UPS 20 is also shown. At this point in the working operation of the system 10, as shown in FIG. 2a, the cache 26 is 75% full of data, as indicated by the shaded bar and the UPS 20 is 100% full of charge, again as indicated by the complete shading. After the power cut, then the storage volume controller 14 must copy the data in the cache 26 to the hard disk 24, as shown, after completion, in FIG. 2b. The data in the cache 26 has been copied to the storage device 24, and the UPS 20 now only has 25% charge after using its charge to power the copy operation.

At a start-up after an EPO, although a lot of the cache 26 may be dirty with respect to the backend storage volumes 12, this content does not actually need to get re-hardened or persisted to the local hard disk 24 in the event of a second power failure if the old file on the local hard disk 24 that has just been used to re-populate the cache 26 is not deleted and is re-referenced for cache pages/lines that have not been changed since the previous EPO.

Figure 3A:
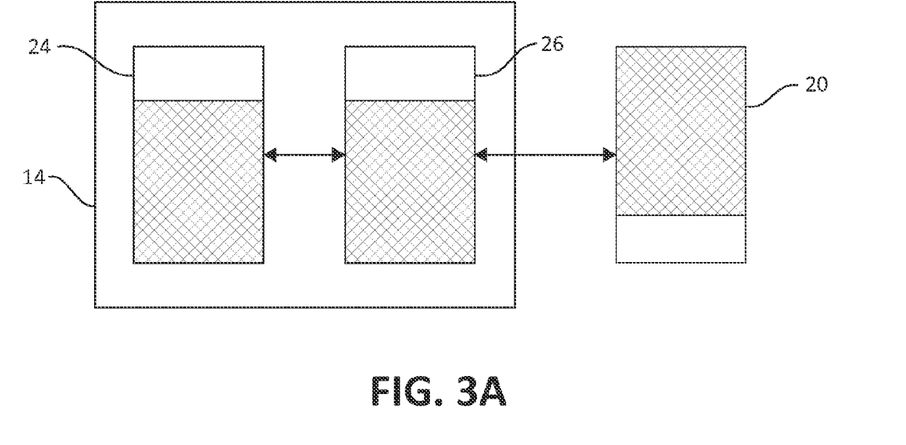

The storage volume controller 14 operates after an emergency shutdown, once power has been restored, to power up the system 10. FIG. 3, following, illustrates the start of this process. On power up after an emergency power off that used up a proportion of the UPS charge, the first action that is taken is that the content of the disk 24 is copied back to the cache 26, and at the same time, the UPS 20 charges its battery as fast as possible. During this stage, no new write workload is accepted as it is not yet safe to do I/O in case of a second power cut before there is enough charge in the UPS 20 to protect against a second power failure.

Figure 3B:
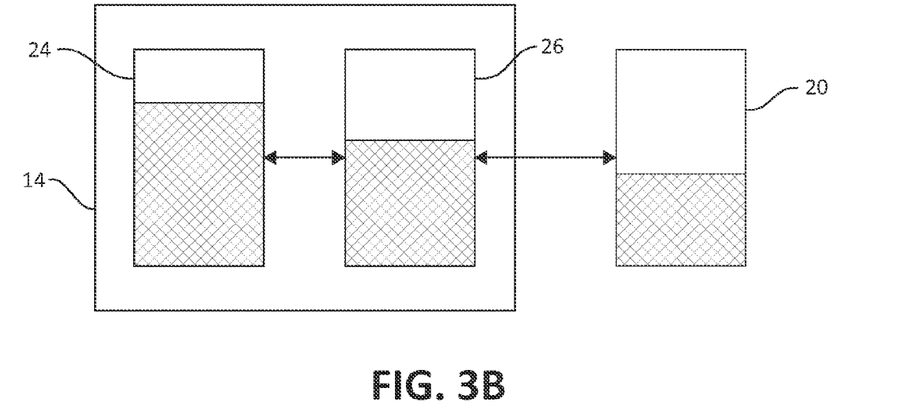

During this stage, the storage volume controller 14 does complete work that is represented in the cache 26, de-staging writes that are in its hardened cache data (that it restored from the cache dump on the local hard disk during its start up) to storage as fast as possible. As the storage volume controller's cache 26 is de-staged to the external disks 12, the storage volume controller 14 will effectively shrink the active cache size in use, as the storage volume controller 14 is currently not accepting any new work so there is no creation of new dirty data in the cache 26. Over time, the full size of the cache 26 in use is reduced downwards as the dirty data in the cache 26 is de-staged to disk 12. So, during this stage, the charge in the UPS 20 is increasing and the amount of the cache 26 with dirty data is reducing as the storage volume controller 14 is not accepting new work, as shown in FIG. 3b.

The system 10 creates a state flag in the cache 26 that represents that a marked cache page/line is dirty (needs to be hardened to a storage volume 12) with respect to the storage volumes 12 but it is the same as the representation of the cache page/line in EPO cache dump file "X", stored in the local disk drive 24, where X can be −1 for the last EPO, −2 for the second last one and so on. Therefore, it is possible to have, for example, three states for a cache line/page, or whatever the unit of memory is to be used, in which, "0" represents a cache line/page that is read only so far and not dirty/hardened, "1" means a cache line/page is dirty/hardened and must be written to the local disk on EPO, and a negative number "−1" means that a cache line/page is dirty but already appears in EPO file generation −1 stored in the local memory 24.

There need not be much depth to this scheme, as the cache 26 is quite likely to become fully re-written to over 0, 1, or a very small number of EPOs. Most of the benefit is had by having a depth of one or two. Alternatively, any other scheme that identifies an old cache dump file would work just as well. This scheme is compact. When any cache line/page is written to, then the flag is set to "1", the standard dirty/hardened flag. Then, when performing a later EPO, if any cache line/page that is about to be written to the local hard disk 24 has a negative flag, then this flag is written to the EPO cache dump rather than the actual contents of the cache line/page. This will be orders of magnitude faster than the current system of copying all of the content of the cache memory 26 over to the hard disk 24.

If the flag that is marking the content in the cache memory 26 is too negative and represents a file that is not present, then the operation can treat the cache line/page as if it has flag 1. However, the storage volume controller 14 can be arranged to prune the cache dump files on startup so such too negative flags can just be not created but instead set to "1" as the system knows it is about to delete the cache dump file they would have referenced.

When reading the hardened data from the local hard disk 24, any negative cache line flag is used to indicate the data is retrieved from the previous (or older) cache dump file stored within the hard disk 24. This means that, as none of the cache memory 26 will have to be re-hardened initially, then only the number of cache pages that have been written to since the most recent start up need to have enough charge in the UPS to be able to harden them (i.e. there is no re-hardening of the same cache lines/pages in multiple files). Thus the UPS recharge is less likely to hold back the initial start of the system operation, as initially, although the cache lines will be dirty, none will be freshly dirty. A simple scheme can be used to prune the number of generations of cache dumps that are retained or used.

The processing that is carried out may be codified into the following three part algorithm, using a cache unit of "line." The operation of the processor 22 in respect of the algorithm can be under the control of a computer program product on a computer readable medium for operating the storage system 10, the software product comprising the necessary instructions for carrying out the algorithm.

```
During an emergency power shutdown
if a cache line is dirty
    if it has a state flag 1 (i.e. not present in another cache dump file)
        then data is written to the cache dump file with flag 1
    else (it has a −ve flag and is already present in a cache dump file)
        let x = the cache line's state flag value
        new_state_flag = x -- (decremented)
        a "new_state_flag" is written for the cache line in dump file
On a subsequent startup
decide on the min generation number = (−1 * no_of_dump_files allowed) + 1
for each cache line in the most recent cache dump {
    if the cache line's data is present {
        read it into cache and set the state flag to −1
    else if the cache line has a negative state marker
```

```
let X = the state marker
    find cache dump file of generation X
    retrieve cache line data from that file and copy into cache
    if X >= minimum generation number
        set the cache line data flag to X
    else
        set the cache line data flag to 1
    }else set the cache line data flag to 0 (cache line not present in dump)
    // the cache line is free for new work
  }
}
prune the number of cache dump files to be within the number allowed.
During normal operation
any write to a cache line will set its state to "1" ( as today)
```

Figure 4:
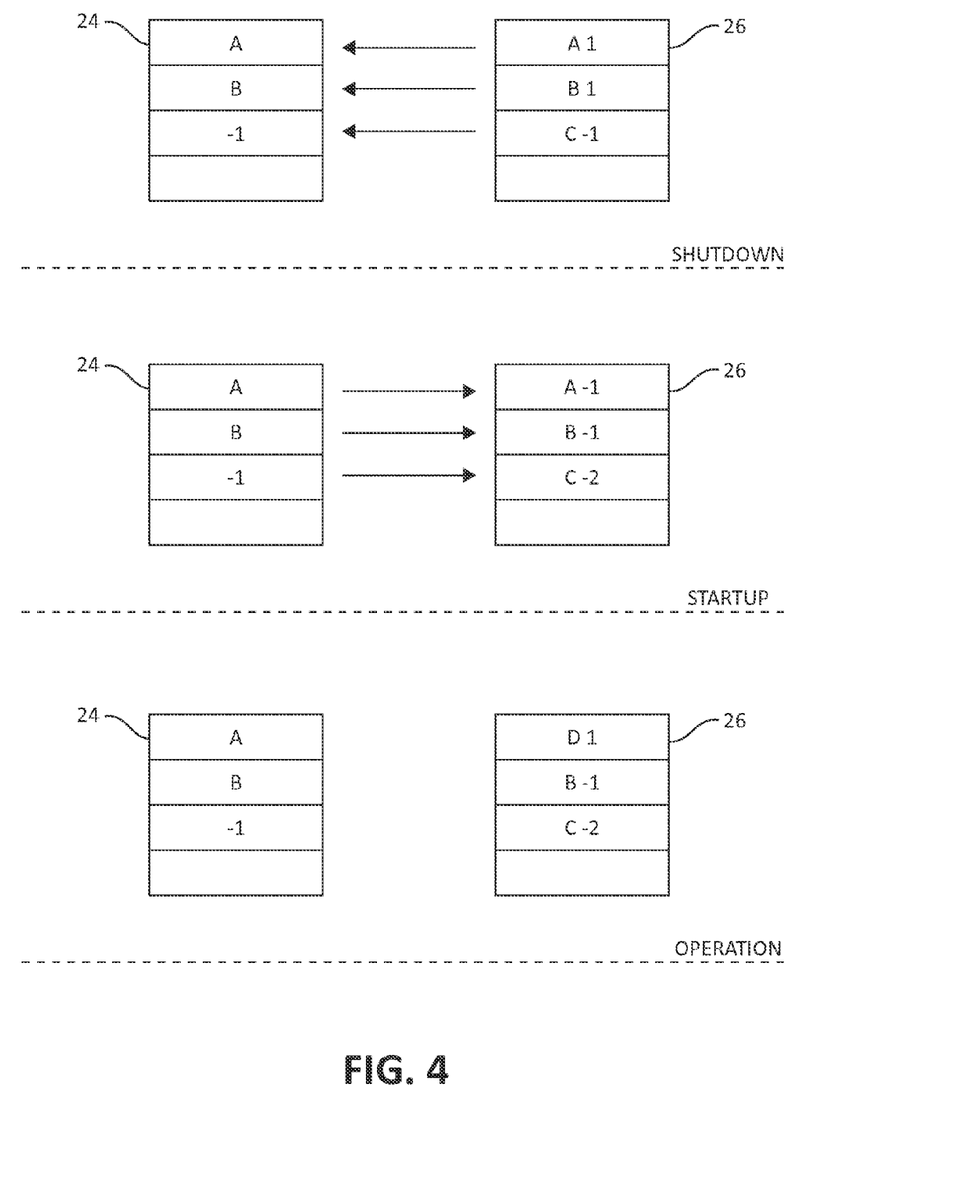

FIG. 4 shows the algorithm detailed above in a working example. The cache memory 26 is shown as having three pages, A, B and C, with pages A and B having a flag of 1, and the page C having a flag of −1. The flag of 1 indicates that the respective page is newly written to the cache 26 and is not stored in the local storage device 24. The flag of −1 means that there has been a previous emergency shutdown and the page C is currently stored in the most recent cache dump file on the storage device 24. In response to a second shutdown there is copied to the local storage device 24 only the content of the cache memory 26 that is not marked as present in the storage device 24. This means that pages A and B are copied across to the storage device 24, and in respect of page C, only the flag −1 is copied to the storage device 24.

On a subsequent start-up of the system, then the cache memory 26 has to be restored to its previous configuration, using the content of the storage device 24. Pages A and B are copied back from the newly created dump file, and page C is recreated from the flag −1, which indicates that it is in the penultimate dump file. New flags are set for the pages, A and B to −1 (present in the last dump file) and C to −2 (present in the penultimate dump file). Now during normal operation of the cache memory 26 any new page being written in, such as page D, is assigned a flag of 1, meaning that the respective page is newly written to the cache 26 and is not stored in the local storage device 24. This Figure shows the creation and changing of the flag values, and how the flag value relates to the operation of the shutdown and startup. If yet another shutdown occurred on the cache memory 26 as shown in the lowest part of the Figure, then the content D would be copied to the local storage device 24 and the flags −1 and −2 would be copied across for pages B and C respectively.

In the storage system 10, the storage volume controller 14 that is configured to restart operation, also has the feature to limit the amount of cache 26 used by a particular storage volume 12 to prevent a slow disk 12 using all of the cache 26. This can be used to choke down the amount of cache 26 used initially after an emergency shutdown. An EPO shutdown is usually not instantaneous, and may take longer than envisaged, for example due to a large workload taking more time to be de-staged from the cache 26 or a communications failure causing time-outs or other reasons such as unusually large amounts of IO or comms traffic (perhaps triggered by the power-off event or system failover) causing the shutdown to drain a good proportion of the UPS stored charge.

In general, when power is restored after a shutdown, the first thing that is achieved is the re-establishment of the UPS safety net by recharging the UPS 20 to its normal operating level of charge. However, the UPS 20 does not need to be fully charged, or indeed charged to a set, fixed level, to allow safe commencing of work but it only needs to contain the sum of enough charge to perform a safe EPO of the underlying 'empty' system plus the variable length of time an emergency EPO takes that correlates with the workload that is done during that operation. It is possible to reduce the second requirement thereby shortening the dead time that the system is down, as the system can start up safely sooner at a lower level of UPS charge.

The UPS 20 and the controller 14 it supports can communicate about how much charge there is in the UPS 20 and the controller 14 can reason about the amount of in-flight workload there currently is in the cache 26 that would need to be de-staged on a new EPO relative to how much charge is in the battery 20. It is therefore possible in the start-up to control the system such that the amount of cache 26 in use could be initially choked down, thus shortening the time for the EPO while the UPS 20 is charging. Once there is sufficient charge on the UPS 20 to deal with a smaller cache 26, then the system can operate normally while locking part of the cache 26 from use. As more charge is accumulated by the UPS 20, then the amount of locked cache can be reduced, until all of the cache 26 is available again.

The idea of starting the system with a reduced cache memory 26 can be combined with the idea of marking the pages/lines in the cache 26 to further speed up the operation of the storage system when there is an emergency power outage and subsequent restart, particularly when a further power cut occurs not long after the first power cut. Not only will a smaller amount of data need to be copied from the cache 26 to the local storage device 24, thereby maintaining more charge on the UPS 20, when the system starts up again, it can restart taking normal work faster as the system will operate with the choked back cache 26, until the UPS 20 has sufficient charge to allow all of the cache 26 to be used.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A storage system comprising:
   at least one storage volume; and
   a storage volume controller in communication with the at least one storage volume, wherein the storage volume controller is configured to:
   detect a cut in an external power supply,
   switch to a local power supply in a first instance,
   prevent receipt of input/output commands in a first instance,
   copy content of a cache memory to a local storage device,
   mark the content of the cache memory with one of a first state flag indicating cached data that is hardened and designated to be written to the local storage device and a second state flag indicating cached data that is hardened and already in a file in the local storage device,
   detect resumption of the external power supply,
   charge the local power supply,
   copy the content of the local storage device to the cache memory,
   process the content of the cache memory with respect to the at least one storage volume,
   receive input/output commands,
   detect a second cut in the external power supply,
   switch to the local power supply in a second instance,
   prevent receipt of input/output commands in a second instance, and
   copy to the local storage device only the content of the cache memory that has the first state flag.

2. The storage system according to claim 1, wherein the storage volume controller is further configured to mark the content of the cache memory that has the second state flag in response to the second power cut, in a different manner to the marking of the same content of the cache memory in response to the first power cut.

3. The system according to claim 1, wherein the storage volume controller is configured to, when copying to the local storage device only the content of the cache memory that has the first state flag, copy to the local storage device the respective mark for the content of the cache memory that is marked with the second state flag.

4. The system according to claim 1, wherein the storage volume controller is configured to, when marking the content of the cache memory, apply a numerical flag to the content.

5. The system according to claim 2, wherein the storage volume controller is configured to, when marking the content of the cache memory, apply a numerical flag to the content, the numerical flag changed with each detected cut in the external power supply.

6. A computer program product for operating a storage system, the computer program product comprising a computer-readable storage medium having computer-readable program code portions stored therein, the computer-readable program code portions comprising:
   a first executable portion for detecting a cut in an external power supply;
   a second executable portion for switching to a local power supply in a first instance;
   a third executable portion for preventing receipt of input/output commands in a first instance;
   a fourth executable portion for copying the content of a cache memory to a local storage device;
   a fifth executable portion for marking the content of the cache memory with one of a first state flag indicating cached data that is hardened and designated to be written to the local storage device and a second state flag indicating cached data that is hardened and already in a file in the local storage device;
   a sixth executable portion for detecting resumption of the external power supply;
   a seventh executable portion for charging the local power supply;
   an eighth executable portion for copying the content of the local storage device to the cache memory;
   a ninth executable portion for processing the content of the cache memory with respect to the or each storage volume;
   a tenth executable portion for receiving input/output commands;
   an eleventh executable portion for detecting a second cut in the external power supply;
   a twelfth executable portion for switching to the local power supply in a second instance;
   a thirteenth executable portion for preventing receipt of input/output commands in a second instance; and
   a fourteenth executable portion for copying to the local storage device only the content of the cache memory that has the first state flag.

7. The computer program product according to claim 6, further comprising a fifteenth executable portion for marking the content of the cache memory that has the second state flag in response to the second power cut, in a different manner to the marking of the same content of the cache memory in response to the first power cut.

8. The computer program product according to claim 6, further comprising a fifteenth executable portion for, pursuant to copying to the local storage device only the content of the cache memory that has the first state flag, copying to the local storage device the respective mark for the content of the cache memory that is marked with the second state flag.

9. The computer program product according to claim 6, further comprising a fifteenth executable portion for, pursuant to marking the content of the cache memory, applying a numerical flag to the content.

10. The computer program product according to claim 7, further comprising a sixteenth executable portion for, pursuant to marking the content of the cache memory, applying a numerical flag to the content, the numerical flag changed with each detected cut in the external power supply.

11. The system according to claim 1, wherein the storage volume controller is further configured to mark the content of the cache memory with one of the first state flag, the second state flag, and a third state flag indicating cached data that has been read is and not to be hardened.

12. The system according to claim 1, wherein the storage volume controller is further configured to change the mark on the cached data from the second state flag to the first state flag, if a limit to which the cached data can remain labeled with the second state flag has been exceeded.

13. The system according to claim 12, wherein:
   the cached data having the second state flag is located in a dump file, and the storage volume controller is further configured:
  to prune data in the dump file, and
  to change the mark on the cached data from the second state flag to the first state flag, in response to a decision to prune data in the dump file.
14. The system according to claim 5, wherein:
the storage volume controller is further configured to, when changing the numerical flag with each detected cut in the external power supply, changing the numerical flag such that the numerical flag increases by a consecutive numerical value each time the external power supply cut is detected to thereby keep track of the cached data copied to the local storage device.
15. The system according to claim 14, wherein the cached data with the first state flag is assigned a positive value and the cached data with the second state flag is assigned a negative value.
16. The computer program product according to claim 6, wherein the fifth executable portion includes marking the content of the cache memory with one of the first state flag, the second state flag, and a third state flag indicating cached data that has been read is and not to be hardened.
17. The computer program product according to claim 6, further comprising a fifteenth executable portion for changing the mark on the cached data from the second state flag to the first state flag, if a limit to which the cached data can remain labeled with the second state flag has been exceeded.
18. The computer program product according to claim 17, wherein the cached data having the second state flag is located in a dump file, and the product further includes:
  a sixteenth executable portion for pruning data in the dump file, and
  a seventeenth executable portion for changing the mark on the cached data from the second state flag to the first state flag, in response to a decision to prune data in the dump file.
19. The computer program product according to claim 10, wherein the sixteenth executable portion further comprises, when changing the numerical flag with each detected cut in the external power supply, changing the numerical flag such that the numerical flag increases by a consecutive numerical value each time the external power supply cut is detected to thereby keep track of the cached data copied to the local storage device.
20. The computer program product according to claim 19, wherein the cached data with the first state flag is assigned a positive value and the cached data with the second state flag is assigned a negative value.

* * * * *